United States Patent [19]

Heinrich

[11] Patent Number: 5,025,371

[45] Date of Patent: Jun. 18, 1991

[54] OVERLOAD PROTECTED RACK AND PINION DRIVE FOR AN OPTICAL SCANNING DEVICE

[75] Inventor: Norbert Heinrich, Vienna, Austria

[73] Assignee: U.S. Philips Corporation, New York, N.Y.

[21] Appl. No.: 257,259

[22] Filed: Oct. 13, 1988

[30] Foreign Application Priority Data

Oct. 16, 1987 [AT] Austria .................................. 2742/87

[51] Int. Cl.$^5$ ............................................. G11B 17/30
[52] U.S. Cl. .................................... 369/219; 369/215; 369/220
[58] Field of Search ............... 369/139, 216, 217, 219, 369/220, 231, 233, 244, 253, 255, 246, 215, 220

[56] References Cited

U.S. PATENT DOCUMENTS

| 2,278,678 | 4/1942 | Stone ................................... 369/219 |
| 4,351,046 | 9/1982 | Elliott ................................... 369/233 |
| 4,442,516 | 4/1984 | Funabashi ......................... 369/219 X |
| 4,831,615 | 5/1989 | Goto et al. ........................ 369/219 X |

FOREIGN PATENT DOCUMENTS 0121661 7/1984 Japan ................................... 369/220
0121662 7/1984 Japan ................................... 369/220

*Primary Examiner*—William M. Shoop, Jr.
*Assistant Examiner*—Randy W. Gibson
*Attorney, Agent, or Firm*—John Francis Moran

[57] ABSTRACT

A slide (19) is driven by a gear mechanism (21) to position a scanning device (15) in a radial direction relative to the record carrier between an innermost track 3) and an outermost track (4), a stop (38) of the slide (19) abutting against a fixed stop (39) on the apparatus when the scanning device (15) is positioned at the outermost track (4). The gear mechanism (21) comprises a pinion (24) driven by a motor (20) and two gear racks (26, 27) which are tensioned relative to one another by a spring (25) and driven by the pinion, one of the gear racks (27) being fixed to the slide (19). When the slide (19) abuts against the fixed stop (39) the gear rack (27) is not in mesh with the pinion (24) and at least one end tooth (40) of the other gear rack (26) is situated in a range where it can mesh with the pinion (24). The spring (25) holds the slide (19) against the stop (39) and urges the other gear rack (26) towards the pinion (24), thus providing overload protection for the motor (20) and the gear mechanism (21).

1 Claim, 2 Drawing Sheets

OVERLOAD PROTECTED RACK AND PINION DRIVE FOR AN OPTICAL SCANNING DEVICE

BACKGROUND OF THE INVENTION

The invention relates to a reproducing apparatus for a rotatable disc-shaped record carrier on which information signals are stored in spiral tracks. A scanning device for scanning the tracks, is arranged on a slide which is movable in a radial direction, by a motor via a gear mechanism to position the scanning device between an innermost position and an outermost position. The gear mechanism includes a pinion and two juxtaposed gear racks which are slidably guided parallel to one another, and which are tensioned relative to each other by means of a spring. One the gear racks is fixedly connected to the slide and a stop which is fixedly connected to the gear rack abuts a fixed stop on the apparatus when the scanning device is set to one of the positions.

In a commercially available apparatus for reproducing audio signals from a disc-shaped record carrier which can be scanned by a laser beam, generally referred to as a Compact Disc player, the pinion always remains in mesh with the two gear racks. When the slide abuts against the fixed stop on the apparatus the pinion is coupled to the gear rack, which is rigidly connected to the slide and, consequently, a positive coupling exists between the pinion and the slide. Control signals are stored in a narrow inner track area of the record, the audio signals are basically stored in a broad central track area, and control signals are stored in a narrow outer track area. The slide is driven to move the scanning device from the inner track area towards the outer track area and during normal operation, when the outer track area is reached but before the scanning device reaches the outer track, the scanning device is rapidly returned towards the inner track area by driving the slide in the opposite direction, after which the slide drive is switched off via a switch which can be actuated by the slide. In order to control the above switching process the slide-drive motor is connected to an electronic control circuit which at the beginning of a scanning operation starts the motor in a predetermined direction of rotation and which during normal operation, before the scanning device reaches the outer track, reverses the direction of rotation of the motor and switches the motor to a higher speed. If the direction of rotation of the motor is not reversed so that its direction of rotation remains the same, which occurs in the case of failure of the control circuit, the stop of the slide will abut against the fixed stop on the apparatus. The motor and the gear mechanism will then be overloaded due to positive coupling between the motor and the fixed stop, on so that these parts of the apparatus are likely to be damaged.

SUMMARY OF THE INVENTION

When the slide abuts against the fixed stop on the apparatus, the gear rack, which is rigidly connected to the slide, is not in mesh with the pinion, and at least one end tooth of the other gear rack is situated within the range of meshing with the pinion. The spring which tensions the two gear racks relative to one another holds the slide positioned against the fixed stop on the apparatus and urges the other gear rack towards the pinion. There is no fully positive coupling between the motor and the fixed stop on the apparatus, and the power is transmitted to the slide partly via a force-sustained coupling by means of the spring which tensions the two gear racks relative to one another. Therefore, if in the event of a fault condition the direction of rotation of the motor is not reversed before the slide abuts against the fixed stop on the apparatus, the other gear rack, which is urged towards the pinion by the spring, will be driven by the pinion via its at least one end tooth. The end tooth is then first driven by a tooth of the pinion, becomes disengaged from the tooth of the pinion, and is urged into the next tooth gap of the pinion under the influence of the spring to mesh with the next tooth of the pinion. This process is repeated periodically, so that the other gear rack performs a periodically reciprocating movement, causing the spring to be loaded and relaxed periodically. Thus, overloading of the motor and the gear mechanism is avoided simply by means of the gear racks and the spring, which are present anyway, without any separate provisions in the gear mechanism or without a separate overload protection device being required. By periodically bringing the end tooth of the other gear rack in mesh with the teeth of the pinion under the influence of the spring a periodic clicking sound is produced to warn the user acoustically of a fault condition in the apparatus.

U.S. Pat. No. 4,152,728 discloses a reproducing apparatus for a rotatable disc-shaped record carrier having a slide which carries a scanning device and which can be driven by a motor via a gear mechanism, in which provisions have been taken to preclude overloading of the motor and the gear mechanism when the slide is blocked. The motor and the gear mechanism are basically arranged on the slide, the gear mechanism comprising a pinion which is rotatably journalled on the slide and which meshes with a single stationary gear rack in the apparatus, whereas in the apparatus in accordance with the invention only the gear rack which is rigidly connected to the slide and, if applicable, also the other gear rack are arranged on the slide, the other parts of the gear mechanism and the motor being arranged on the apparatus. In order to prevent the motor and the gear mechanism from being overloaded, a further pinion of the gear mechanism, is rotatably supported and during normal operation meshes with a gear wheel which is connected to coaxially the pinion. The further pinion is arranged on a support which is mounted on the slide so as to be pivotable about a pivotal axis parallel to the axes of the two pinions and is kept in mesh with the gear wheel under the influence of a spring acting on the support. If the slide is blocked the pivotable further pinion is periodically disengaged from the gear wheel by pivoting the slide against the force of the spring and in this way the existing positive coupling is interrupted periodically to prevent overloading. Thus, a comparatively intricate movable support for the further pinion is needed for the purpose of overload protection, whilst in the apparatus in accordance with the invention overload protection is achieved directly, without any additional steps, by means of the two gear racks and the spring which tensions these gear racks relative to one another.

DETAILED DESCRIPTION OF THE PREFERRED EMBODIMENT

Figure 1:
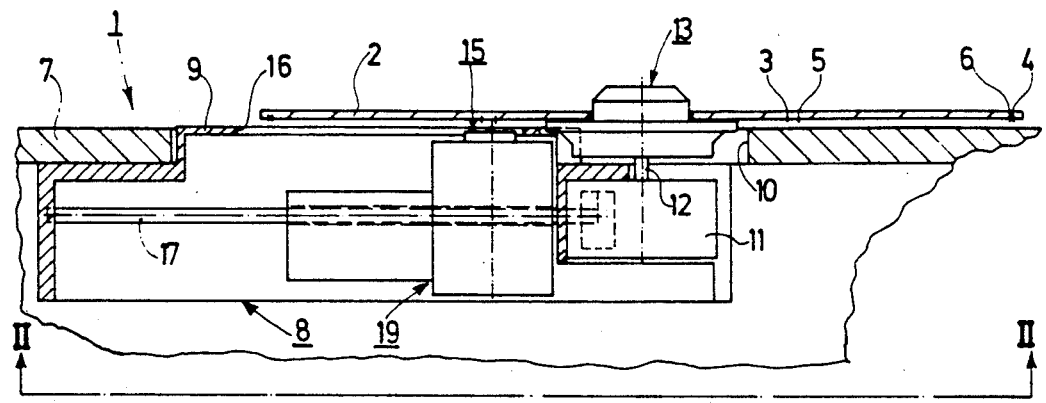
FIG. 1 is a partial side section view taken along line I—I of FIG. 2.
Figure 2:
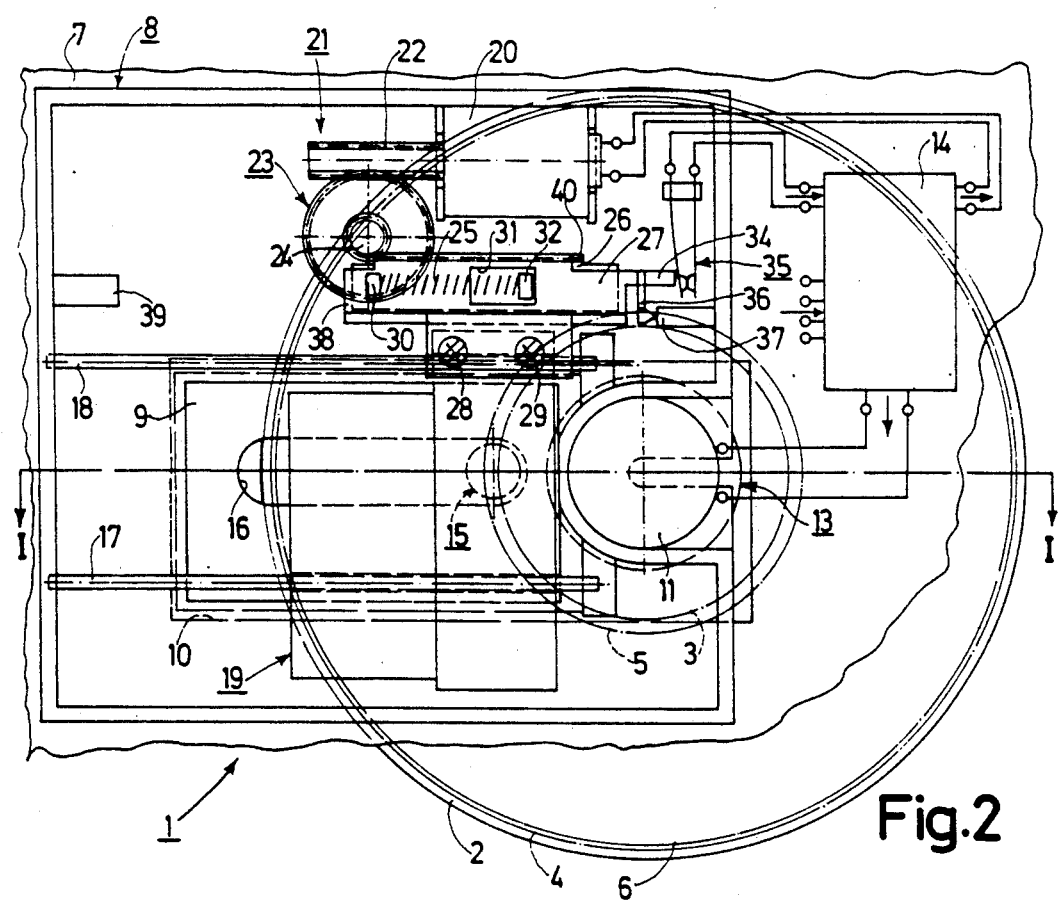
FIG. 2 is a bottom plan view with the scanner at the inner track area.
Figure 3:
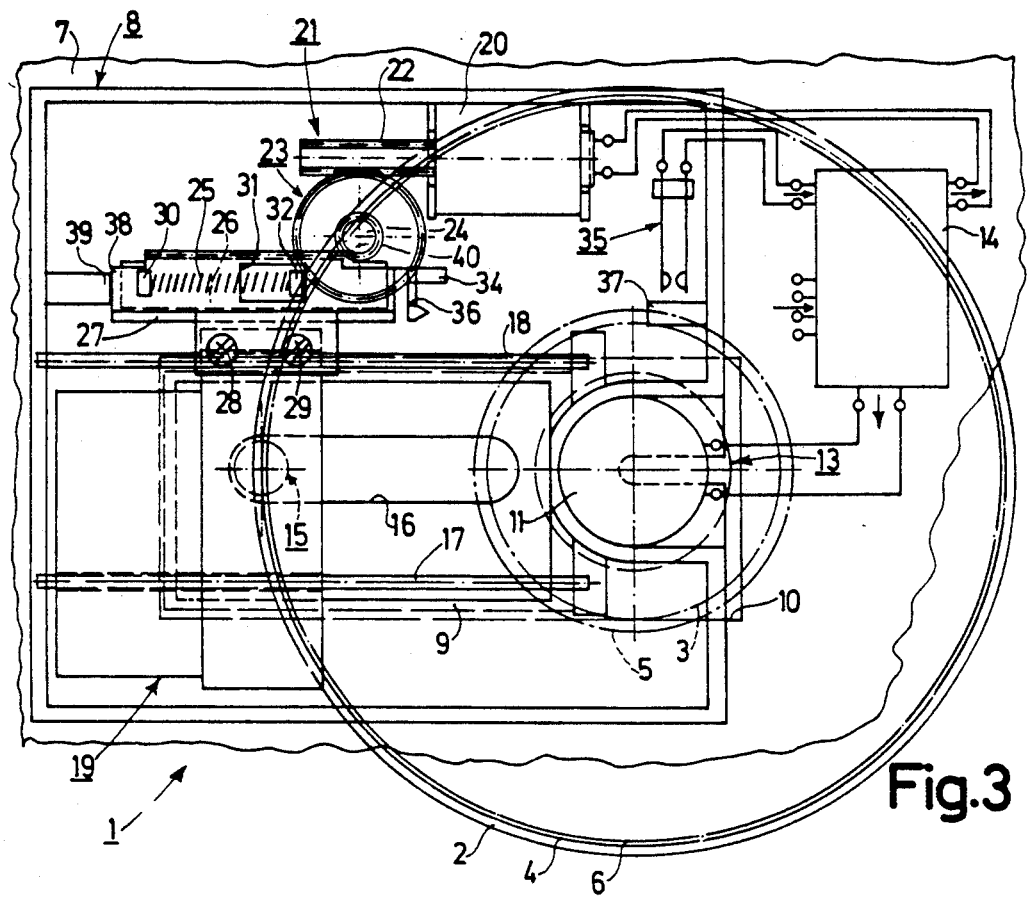
FIG. 3 is a bottom plan view with the scanner at the outer track area.

FIGS. 1 to 3 show a reproducing apparatus 1 intended for reproducing information signals from a rotatable disc-shaped record carrier 2 on which information signals are stored in spiral tracks situated between an innermost track 3 and an outermost track 4. A narrow inner track area in which the control signals are stored is situated between the innermost track 3 and a slightly further outward track 5. A broad central track area in which the actual audio signals are stored is situated between the track 5 and the track 6 which is situated substantially further outwards. A narrow track area in which the control signals are stored is situated between the track 6 and the outer track 4. The tracks 3, 4, 5 and 6 are represented diagrammatically by dash-dot lines in FIGS. 2 and 3. The record carrier is generally known as a "Compact Disc". This record carrier is an optically scanned record carrier whose tracks on one of its major surfaces can be scanned by a laser beam, the information signals stored in the tracks being readable by means of the laser beam.

The reproducing apparatus 1 comprises a housing 7, which accommodates a chassis 8 having a raised portion 9 which extends through an opening 10 in the housing 7. The chassis 8 carries a motor 11, a turntable 13 being mounted on its motor shaft 12, which extends through the opening 10 in the housing 7. The record carrier 2 can be placed on the turntable 13. The motor 11 is connected to a control circuit 14 which comprises a microprocessor and by means of which the motor can be energised with a controlled voltage to drive the motor 11 and hence the record carrier 2 in such a way that their speeds are controlled. The control circuit 14 is shown only diagrammatically because its circuit arrangement is not relevant to the present invention and because such circuit arrangements are generally known.

A scanning device 15, shown diagrammatically, is movable radially of the record carrier and has a laser beam generation system by means of which a laser beam for scanning the tracks can be generated. The scanning device 15 extends through an opening 16 in the raised portion 19 of the chassis 8, and aims the beam at the major surface of the record carrier 2 on which the tracks are situated. After reflection from the tracks the beam is processed by a photo-electric detection system which forms part of the scanning device 15, in order to reproduce the information signals stored. FIG. 2 illustrates an operating situation in which the scanning device 15 is positioned at a track in the inner track area between the tracks 3 and 5, in such a way that the laser beam is directed towards at this track. FIG. 3 illustrates the situation in which the scanning device is positioned at the outer track 4, so that the laser beam is directed towards the outer track 4.

The scanning device 15 is arranged on a slide 19 which is movable in a radial direction relative to the record carrier 2 and which is slidably guided by means of two guide rods 17 and 18. For moving the scanning device 15, the slide 19 is movable between the innermost track 3 and the outermost track 4 by means of a further motor 20 via a gear mechanism 21. The gear mechanism 21 includes a worm 22, driven by the further motor 20, and meshing with a wormwheel combination 23, having two coaxial wormwheels tensioined relative to each other by means of a spring. Pinion 24, is coaxial with the wormwheel combination 23, and drives two gear racks 26 and 27, disposed adjacent each other in the axial direction of the pinion, tensioned relative to one another by means of a compression spring 25. The gear racks are guided so as to be movable parallel to one another by means of pin slot connections between the two gear racks, of which one gear rack 27 is fixedly connected to the slide 19 by means of two screws 28 and 29. One end of the compression spring 25, which is retained in a cage, not shown, on gear rack 27, bears against a projection 30 on the gear rack 27 and its other end bears against a projection 32, which projects from the other gear rack 26 through an opening 31 in one gear rack 27. When the two gear racks 26 and 27 mesh with the pinion 24 the compression spring 25 ensures in known manner that oppositely directed tooth flanks of their meshing teeth engage with oppositely directed tooth flanks of the meshing teeth of the pinion 24, so that there is no backlash between the pinion 24 and the two gear racks 26 and 27. The projection 32 is then lifted off that bounding wall of the opening 31 in one gear rack 27 which is remote from the projection 30 against the force of the compression spring 25, and the teeth of the two gear racks 26 and 26 are offset relative to one another, viewed in the direction of the tooth flanks. By tensioning the two wormwheels relative to one another and tensioning the two gear racks relative to one another the gear mechanism 21 is without backlash, which guarantees an accurate movement of the slide 19 in either direction of movement.

The further motor 20 is also connected to the control circuit 14 by means of which the appropriate voltage can be supplied to the further motor 20, so as to ensure that the further motor 20 drives the slide 19 via the gear mechanism 21 either in the direction from the inner track 3 towards the outer track 4 or in the opposite direction. In order to move the slide 19 from the inner track 3 towards the outer track 4, the control circuit 14 supplies a voltage to further motor 20 so that it drives the pinion 24, in the clockwise direction, as indicated by arrow 33 in FIG. 4.

During normal operation, when the record carrier 2 is scanned completely, the slide 19 is driven to move the scanning device 15 from the inner track area between the tracks 3 and 5 towards the outer track area between the tracks 6 and 4. When the outer track area is reached, but before the scanning device 15 reaches the outer track 4, the device is rapidly returned to the inner track area by driving the slide 19 in an opposite direction. The drive for the slide 19 is then switched off by means of a switch 35 actuated by a stop 34 connected to the slide 19. In the present reproducing apparatus 1 the stop 34 is constituted by a projection of a gear rack 27 which is fixed to the slide 19. Obviously, such a switch can also be actuated by the slide 19 itself. The switch 35 is connected to the control circuit 14, which detects closure of the switch 35 and in response thereto de-energises the further motor 20. Thus, the operating position of the slide 19 and of the scanning device 15, when it has been moved towards the inner track area, is dictated by the switch 35. In this operating position of the slide 19 the free end of a resilient tongue 36 which projects transversely of the projection 34 of one gear rack 27 abuts against a stop 37 on the chassis 8, thereby causing the resilient tongue 36 to exert a force on one gear rack 27 to keep the two gear racks 26 and 27 in mesh with the pinion 24.

During normal operation as already stated, the drive of the slide 19 is reversed before the scanning device 15 has reached the outer track 4. This is effected in such a way that, as soon as the scanning device 15 reaches the outer track area between the two tracks 6 and 4, control information is derived from control signals stored in this track area and is applied to the control circuit 14 via one of the further control inputs, after which the control circuit changes the polarity of the supply voltage to the further motor 20 and sets this voltage to a higher value; this step is also common practice in such apparatuses. As a result of disturbances affecting the control circuit and a consequent erroneous control, reversal of the drive of the slide 19 may not occur, in which case the further motor 20, after the scanning device 15 has reached the outer track area, continues to rotate in the same direction. The slide 19 is then driven until the scanning device 15 has reached the outer track 4, as is shown in FIG. 3. A stop 38 which is fixed to the slide 19 now abuts against a fixed stop 39 on the chassis 8 of the apparatus. In the present reproducing apparatus 1 the stop 38, which is fixed to the slide 19, is constituted by a projection of one gear rack 27 which is rigidly connected to the slide 19. Obviously, it is also possible to provide a stop which is integral with the slide, such as a slide wall, and which cooperates with a fixed stop on the apparatus. The engagement of the slide 19 against the stop 39 on the apparatus ensures that the scanning device 15 can move up to the outermost track 4 but cannot move beyond this track, so that the scanning device 15 can never leave the track area of the record carrier 2.

Figure 4:
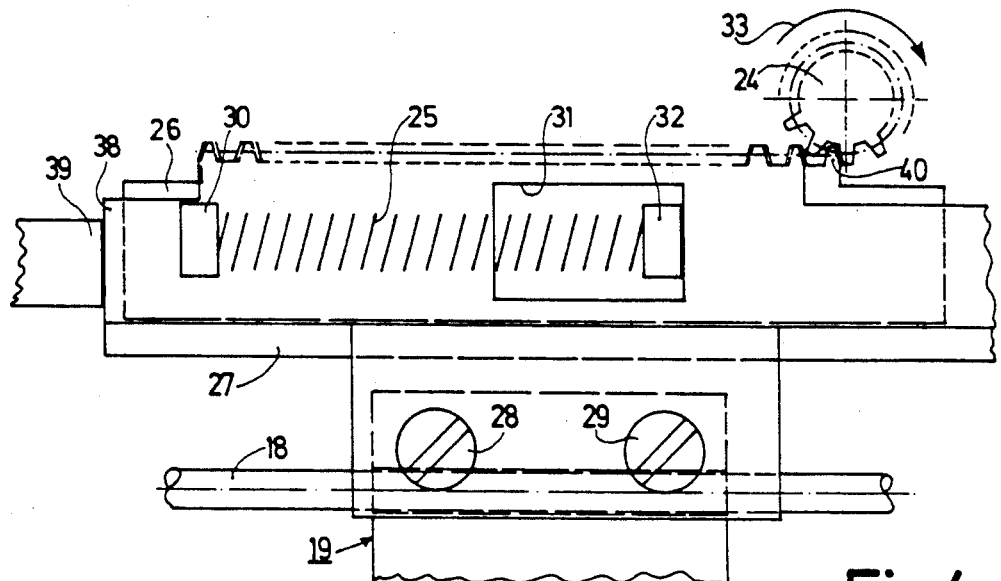
FIG. 4 is an enlarged partial bottom plan view showing the slide drive means.

When the stop 38 of the slide 19 abuts against the fixed stop 39 on the apparatus, as can be seen in FIG. 3 and in particular in FIG. 4, the gear rack 27 which is fixed to the slide is not in mesh with the pinion 24 and the other gear rack 26 is situated in an area where its end tooth 40 can mesh with the pinion 24. The pressure spring 25, which tensions the two gear racks 26 and 27 relative to one another, ensures that the slide 19 engages against the fixed stop 39 on the apparatus and urges the other gear rack 26 towards the pinion 24. When the slide 19 abuts against the stop 39, the power transmission from the further motor 20 to the slide 19 is partly effected non-positively, namely via the pressure spring 25, which keeps the two gear racks 26 and 27 tensioned relative to one another. If in the event of a fault condition the direction of rotation of the further motor 20 is not reversed before abutment of the slide 19 against the stop 39, the other gear rack 26, which is urged towards the pinion 24 by the pressure spring 25, will be driven by the pinion 24 via the end tooth 40 of this other gear rack. The end tooth 40 is then first driven by a tooth of the pinion 24, after which it becomes disengaged from this tooth of the pinion and is urged into the next tooth gap of the pinion by the pressure spring 25 to mesh with the next tooth of the pinion. This process is repeated periodically, so that the other gear rack 26 performs a periodic reprocating movement, causing the pressure spring 25 to be loaded, i.e. compressed, and relaxed periodically. Overloading of the further motor 20 or the gear mechanism 21 in the present reproducing apparatus 1 is thus precluded in a very simple manner by means of the gear racks 26 and 27 which are present anyway, and the pressure spring 25, which is also present anyway, without any separate provisions in the gear mechanism being required or a separate overload protection means being needed. By periodically bringing the end tooth 40 of the other gear rack 26 in mesh with the teeth of the pinion 24 under the influence of the pressure spring 25, a periodic clicking sound is produced, so that the user is informed about the fault condition.

If after elimination of an incorrect control of the further motor 20 as described above the pinion 24 is driven in a direction opposite to that indicated by the arrow 33 in FIG. 4, the pinion 24 will first drive the other gear rack 26 via the end tooth 40. This causes the gear rack 27, which is tensioned relative to the other gear rack 26 and fixed to the slide 19, to be driven and to mesh again with the pinion 24. Under the influence of the pressure spring 25 oppositely directed tooth flanks of the meshing teeth of the two gear racks 26 and 27 then again engage with oppositely directed tooth flanks of the meshing teeth of the pinion 24, so that the freedom from backlash required for a precise displacement of the slide 19 in either direction of movement is restored.

When the slide 19 abuts against the stop 39, only one end tooth of the other gear rack 26, which is not rigidly connected to the slide, will be situated within the range where meshing with the pinion is possible. Alternatively, two or more end teeth this other gear rack 26 may be situated within the meshing range of the pinion 24, causing the other gear rack 26 to reciprocate with a larger travel in the event of incorrect control of the slide-drive motor. In the reproducing apparatus described in the foregoing the other gear rack 26 is slidably guided relative to the gear rack 27 which is rigidly connected to the slide 19 by means of pin slot connections. Alternatively the other gear rack 26 may be slidably guided directly on the slide 19 or on the chassis 8. Instead of a pressure spring for tensioning the two gear racks relative to one another, it is also possible to employ other springs, for example a tension spring.

What is claimed is:

1. A reproducing apparatus for a rotatable disc-shaped record carrier on which information signals are stored in spiral tracks, comprising a scanning device for scanning the tracks, which scanning device is arranged on a slide which is movable in a radial direction relative to the record carrier, which slide is movable by a motor via a gear mechanism to position the scanning device between an innermost position and an outermost position, which gear mechanism comprises a pinion which can be driven by the motor and two juxtaposed gear racks which can be driven by the pinion, which are slidably guided parallel to one another, and which are tensioned relative to each other by means of a spring, one of said gear racks being fixedly connected to the slide and a stop which is fixedly connected to said gear rack abutting, against a fixed stop on the apparatus when the scanning device is set to one of said positions, characterized in that when the slide abuts against the fixed stop on the apparatus, the gear rack, which is rigidly connected to the slide, is not in mesh with the pinion and at least one end tooth the other gear rack is situated within the range of meshing with the pinion and the spring which tensions the two gear racks relative to one another holds the slide positioned against the fixed stop on the apparatus and urges the other gear rack towards the pinion.

* * * * *